(12) United States Patent
Marmet et al.

(10) Patent No.: US 10,605,927 B2
(45) Date of Patent: Mar. 31, 2020

(54) RELAY VEHICLE FOR TRANSMITTING POSITIONING SIGNALS TO ROVERS WITH AN OPTIMIZED DILUTION OF PRECISION

(71) Applicant: CENTRE NATIONAL D'ETUDES SPATIALES, Paris (FR)

(72) Inventors: François-Xavier Marmet, Muret (FR); Nicolas Capet, Toulouse (FR)

(73) Assignee: CENTRE NATIONAL D'ETUDES SPATIALES, Paris (FR)

( * ) Notice: Subject to any disclaimer, the term of this patent is extended or adjusted under 35 U.S.C. 154(b) by 102 days.

(21) Appl. No.: 15/936,704

(22) Filed: Mar. 27, 2018

(65) Prior Publication Data

US 2018/0284291 A1 Oct. 4, 2018

(30) Foreign Application Priority Data

Apr. 3, 2017 (EP) ..................................... 17305396

(51) Int. Cl.
*G01C 15/00* (2006.01)
*G01S 19/10* (2010.01)
(Continued)

(52) U.S. Cl.
CPC ............ *G01S 19/46* (2013.01); *B64C 39/024* (2013.01); *G01S 1/00* (2013.01); *G01S 5/10* (2013.01); *G01S 19/10* (2013.01); *G01S 19/11* (2013.01); *G01S 19/14* (2013.01); *G05D 1/0202* (2013.01); *G05D 1/0206* (2013.01); *G05D 1/028* (2013.01); *G05D 1/0257* (2013.01); *G05D 1/0291* (2013.01); *G05D 1/104* (2013.01);
(Continued)

(58) Field of Classification Search
CPC ......... G01C 15/00; G01S 19/10; G01S 19/51; G01S 19/07; G05D 1/02; G05D 1/0291; G05D 1/0257
USPC ............................................................. 701/3
See application file for complete search history.

(56) References Cited

U.S. PATENT DOCUMENTS

| 10,371,791 B2* | 8/2019 | Jongsma | ................... G01S 5/16 |
| 2005/0180263 A1* | 8/2005 | Lambert | .................. G01S 1/72 367/128 |

(Continued)

FOREIGN PATENT DOCUMENTS

| EP | 2511658 A1 | 10/2012 |
| WO | 03/100451 A2 | 12/2003 |

OTHER PUBLICATIONS

European Search Report for 17305396.8 dated Oct. 17, 2017.
(Continued)

*Primary Examiner* — Tan Q Nguyen
(74) *Attorney, Agent, or Firm* — Meagher Emanuel Laks Goldberg & Liao, LLP

(57) ABSTRACT

The invention discloses a constellation of relay vehicles comprising a receiver of navigation signals and a transmitter of positioning signals to an area of service where a number of rovers manoeuver, wherein the position of the relay vehicle may be adjusted to optimize one or more of an SNR or a DOP index of the positioning signals. In some embodiments, the optimal configuration of the constellation of relay vehicles may be further defined based on priority indexes allocated to the rovers. The invention is applicable to terrestrial or underwater rovers, respectively serviced by aerial or nautical relay vehicles.

14 Claims, 13 Drawing Sheets

(51) Int. Cl.
  *G01S 19/46* (2010.01)
  *G05D 1/02* (2020.01)
  *G01S 5/10* (2006.01)
  *H04W 4/00* (2018.01)
  *G01S 19/14* (2010.01)
  *G05D 1/10* (2006.01)
  *G01S 19/11* (2010.01)
  *G01S 1/00* (2006.01)
  *B64C 39/02* (2006.01)
  *H04W 4/02* (2018.01)
  *G01S 1/70* (2006.01)
  *H04W 4/40* (2018.01)
  *G01S 1/68* (2006.01)

(52) U.S. Cl.
  CPC ............. *H04W 4/00* (2013.01); *H04W 4/023* (2013.01); *B64C 2201/122* (2013.01); *G01S 1/68* (2013.01); *G01S 1/70* (2013.01); *H04W 4/40* (2018.02)

(56) References Cited

U.S. PATENT DOCUMENTS

| | | | |
|---|---|---|---|
| 2014/0210663 A1* | 7/2014 | Metzler | G01C 15/00 342/357.34 |
| 2016/0214715 A1* | 7/2016 | Meffert | B64C 39/024 |
| 2018/0114441 A1* | 4/2018 | Marmet | G01C 21/30 |
| 2019/0187050 A1* | 6/2019 | Alkadi | G01C 21/20 |

OTHER PUBLICATIONS

Liu, Min et al. "A Recursive Quasi-optimal Fast Satellite Selection Method for GNSS Receivers", ION GNSS 2009, Sep. 2009, Savannah, GA, USA.

M.R. Mosavi, "An Effective Method for GPS GDOP Clustering Using Ant Colony Optimization Optimization", Asian Journal of Geoinformatics, vol. 10, N. 4, 2010.

* cited by examiner

| Carrier frequency [MHz] | Distance Tx/Rx [km] | Tx antenna gain [dB] | Rx antenna gain [dB] | Losses [dB] |
|---|---|---|---|---|
| 433 | 0.1 | 0 | 0 | 65 |
| 433 | 1 | 0 | 0 | 85 |
| 433 | 10 | 0 | 0 | 105 |
| 433 | 100 | 0 | 0 | 125 |
| 433 | 0.1 | 3 | 3 | 59 |
| 433 | 1 | 3 | 3 | 79 |
| 433 | 10 | 3 | 3 | 99 |
| 433 | 100 | 3 | 3 | 119 |
| 2400 | 0.1 | 0 | 0 | 80 |
| 2400 | 1 | 0 | 0 | 100 |
| 2400 | 10 | 0 | 0 | 120 |
| 2400 | 100 | 0 | 0 | 140 |
| 2400 | 0.1 | 3 | 3 | 84 |
| 2400 | 1 | 3 | 3 | 104 |
| 2400 | 10 | 3 | 3 | 114 |
| 2400 | 100 | 3 | 3 | 134 |

FIG.7

RELAY VEHICLE FOR TRANSMITTING POSITIONING SIGNALS TO ROVERS WITH AN OPTIMIZED DILUTION OF PRECISION

FIELD OF THE INVENTION

The invention relates to vehicles for relaying GNSS signals. More specifically the positions of the GNSS relays of the invention may be adapted, possibly in real time, to improve the quality of the relayed signals received by an end-user receiver.

BACKGROUND

The use of navigation receivers becomes increasingly pervasive in everyday life. It is all the more common that cars' on-board electronics, smart phones, tablets include navigation receivers, and that applications running thereon capture as input information on position and trajectory of the user of the terminal.

Navigation receivers rely on L-Band RF signals transmitted by Medium Earth Orbiting satellites, which are generally included in constellations comprising tens of them to cover most of the surface of the earth, such as the GPS™ (US), Galileo™ (Europe), Glonass™ (Russia) and Beidou™ (China). These constellations are designated under the generic acronym of GNSS (Global Navigation Satellite System).

GNSS carrier signals are modulated by a pseudo-random code and a navigation message that allow calculation of a pseudo-range between the receiver and a specific satellite. With a minimum of four pseudo-ranges, it is possible to calculate Position, Velocity and Time (PVT) of the receiver.

PVT measurements are affected by a number of errors, some of which are intrinsic to the principle of measurement used (e.g. due to the propagation delay variation of the RF signals through the atmosphere—ionosphere and troposphere, due to variations in the orbits of the satellites), intrinsic to the receiver and satellite imperfections (clock biases for instance), or intrinsic to some configurations of the satellites in view at a moment in time (i.e. elevation of the satellites over the horizon; low dispersion of visible satellites—high Dilution of Precision or DOP). A number of corrections may be used to mitigate these errors, with the use of specific processing techniques which are only available to certain types of receivers. For instance, bi-frequency receivers can mitigate ionospheric errors with a gain of precision from a few tens of meters to a few meters, and even better when combined with precise satellite orbits and clocks which then providing Precise Point Positioning (PPP)—a precision of a few tens of centimetres. Differential GPS and Real Time Kinematics solutions provide similar precision from integration of outside information (relative positioning vis-à-vis a number of fixed reference stations with known positions).

It is more difficult to mitigate in a consistent and efficient manner some errors which depend on the position of the receiver, notably when this position is surrounded by a number of objects which reflect and/or fade the navigation RF signals and/or mask a number of the satellites which should be in line of sight (LOS) at a moment in time. In such conditions, often referred to as GNSS multipath environments, the precision of the calculation of the PVT may be quite poor, all other causes of errors being equal, both at the time of acquiring a GNSS signal and at the time of tracking said signal.

In urban canyons (i.e. streets in between tall buildings), multipath will not only increase the error in the determination of the pseudo-range of a satellite (User Equivalent Range Error or UERE), but also the (Geometric) Dilution Of Precision (GDOP or DOP), because the field of view of the antenna will be narrower thus limiting the increase in precision that may come from the use of additional satellites.

The degradation in UERE is due to the signal impairments of the specific satellite which is acquired or tracked by a tracking loop. Tracking of a satellite relies on a maximization of a correlation function between the acquired code signal and a number of local replicas generated by the receiver of the code signals which are specific to each satellite. The correlation functions will be corrupted by multipath and the satellite may not be correctly acquired or may be lost. Even if the signal tracking is still achievable, signal impairments will affect the correlation function's shape, thus degrading the pseudo-range estimation, and the UERE.

A number of mitigation techniques rely on an increase in the number of correlators to improve the performance of the receiver in a perturbed environment. A number of variants of signal processing techniques may also be added, depending on the waveform of the carrier signal. They may improve the quality of the pseudo-range measurements for the satellites in the field of view (FOV) of the receiver but will not improve the number of these satellites in view or the variance of their elevations. Thus, even with the use of complex and costly receivers, the DOP will be poor in any kind of environment where the FOV of the receivers is reduced.

The present invention discloses a solution to overcome the previously cited drawbacks.

SUMMARY OF THE INVENTION

To this effect, the invention discloses a vehicle configured to navigate at or above a surface level, the vehicle comprising: a receiver of navigation signals; one or more transmit units; a processor; wherein the one or more transmit units are configured to transmit to rovers located under or at the surface level a positioning signal representative of one or more of a position, a velocity or a time of the vehicle, said positioning signal determined based on navigation signals received by the receiver of navigation signals; and the processor is configured to one or more of acquire or calculate navigation commands to navigate the vehicle based on a criterion comprising an optimization of a relative positioning of the vehicle to at least one of the rovers.

Advantageously, the vehicle of the invention is a sea level vehicle, the rovers being underwater rovers and the one or more communication links being one or more of acoustic and optical.

Advantageously, the vehicle of the invention is an air vehicle and the rovers being ground level rovers.

Advantageously, the one or more transmit units use one or more of an RF or an optical downlink to the rovers.

Advantageously, the vehicle of the invention further comprises one or more receive units using one of an RF or an optical uplink from one or more of another air vehicle, a rover or a base station.

Advantageously, the processor acquires the navigation commands from one or more of another air vehicle, a rover or a base station.

Advantageously, the processor acquires a position of the at least one rover from one or more of another air vehicle, a rover or a base station and calculates the navigation commands therefrom.

Advantageously, the navigation commands take into account one or more indexes representative of a number of vehicles that transmit positioning signals to the at least a rover, an elevation of each vehicle in the number of vehicles relative to the surface level or a quality of the transmission.

Advantageously, the optimization of the relative positioning is to a plurality of other vehicles and/or to a plurality of the rovers.

Advantageously, the optimization of the relative positioning to the plurality of other vehicles and/or to the plurality of the rovers is based on an a priori knowledge of a topography of the surface level Advantageously, the optimization of the relative positioning to the plurality of the rovers is based on an equal treatment of the rovers in an area of responsibility allocated to the vehicle.

Advantageously, the optimization of the relative positioning to the plurality of the rovers is based on a privileged treatment of one or more among the rovers in an area of responsibility allocated to the vehicle.

The invention also discloses a positioning method comprising: navigating a vehicle at or above a surface level; receiving navigation signals at a receiver on-board the vehicle; establishing one or more communication links with one or more other vehicles or rovers located under or at the surface level; transmitting to the rovers a positioning signal representative of one or more of a position, a velocity or a time of the vehicle, said positioning signal determined based on navigation signals received by the receiver of navigation signals; acquiring or calculating at a processor navigation commands to navigate the vehicle based on a criterion comprising an optimization of a relative positioning of the vehicle to at least one of the rovers.

The invention is versatile enough to be implemented on different types of relay vehicles, i.e. aerial vehicles that retransmit positioning signals to rovers in an area of service on a surface (pedestrians or vehicles) or nautical vehicles that retransmit positioning signals to divers or underwater vehicles.

It may also be implemented in a number of different communication and/or processing architectures. In some embodiments, the invention may be implemented using only downlinks to transmit the positioning signals from the relay vehicles to the rovers. In some of these embodiments, the positioning of the relay vehicles is determined based on an a priori.

In some other embodiments, the invention may be implemented using symmetrical downlinks/uplinks between the relay vehicles and the rovers. The downlinks may use an RF communication, optical or acoustic media. In some underwater embodiments, the uplinks may use a cable communication media. In still some other embodiments, the uplinks may be to a base station or a single relay vehicle that will retransmit information received from the rovers or processed thereof to the other relay vehicles. In a number of these embodiments, one of the relay vehicles may be a master relay vehicle equipped with a processing capability to compute all or part of the navigation commands to be executed by the other relay vehicles to optimize the DOP and/or SNR (Signal to Noise Ratio) of the whole configuration. In an architecture of this type, the costs of the constellation of relay vehicles may be significantly decreased. In these embodiments, it is possible to use different algorithms to optimize the DOP and/or the SNR of the positioning signals received at the rovers.

In some embodiments, all the rovers are treated equally in the procedure to optimize the position of the relay vehicles. In some other embodiments, some of the rovers may be granted privileges.

Thanks to its versatility, the invention may be adapted to a number of use cases. The invention may be used to provide rescue workers in an area that has been destroyed by an earthquake with accurate positioning, even in a difficult environment (including from a RF interference point of view). It may be used to guide divers or unmanned underwater rovers in the course of a rescue or search underwater operation. It may also be used to provide positioning services in difficult urban areas, such as urban canyons, especially when high integrity and/or high accuracy is mandatory, for example for guiding autonomous cars. It may be used to position people or equipment under canopies or in the vicinity of trees or various environment.

BRIEF DESCRIPTION OF THE DRAWINGS

The invention and its advantages will be better understood upon reading the following detailed description of particular embodiments, given purely by way of non-limiting examples, this description being made with reference to the accompanying drawings in which:

FIG. 7 is a table of signal losses in a number of embodiments of a communication link to implement the invention;

DETAILED DESCRIPTION

Figure 1:
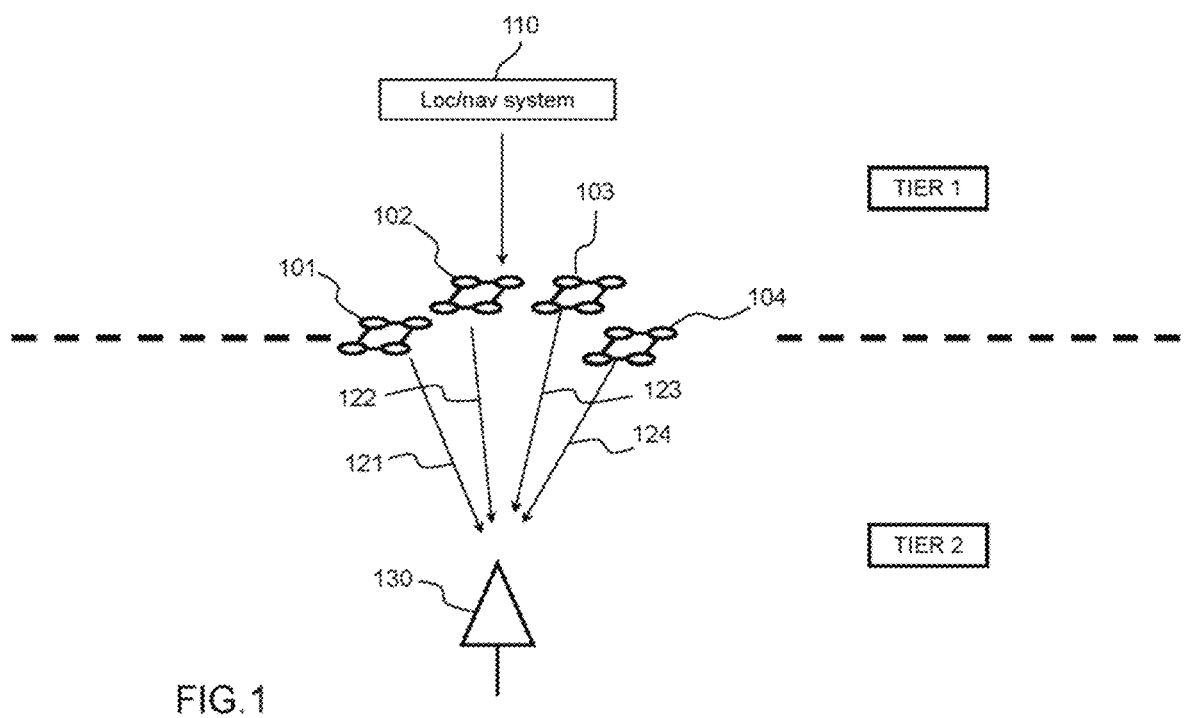
FIG. 1 displays a schematic view of a functional architecture to implement the invention in a number of its embodiments.

FIG. 1 displays a schematic view of a functional architecture to implement the invention in a number of its embodiments.

In a number of areas, GNSS positioning may suffer from a low SNR, heavy multipath reflections and/or high DOP, so that the accuracy of the calculation of the PVT from the direct GNSS positioning signals will be low. Moreover, the accuracy may vary significantly from one spot in an area to another spot, because LOS of some satellite may be lost when moving from the first spot to the second spot. Under these circumstances, it is not possible to guarantee the integrity and the availability of the navigation solution.

According to the invention, a two-tier navigation system is provided. Tier 1 is formed by a positioning infrastructure, 110. Depending on where one is located on or above the surface of earth, the positioning infrastructure may comprise a plurality of satellites that belong to one or more GNSS constellations selected amongst GPS, Galileo, Glonass, Beidou or other constellations in operation or that will be deployed in the future. It may also comprise satellites from a Satellite Based Augmentation System (SBAS) that provides corrections, such as Egnos. It may also comprise ground stations from a Ground Based Augmentation System that will also provide corrections and/or reference measurements. Receivers used to implement the invention may also be configured to receive signals transmitted by pseudolites such as those marketed by Locata™. At some given points on earth and at given times of the day, more than 50 satellites/stations transmitting positioning signals may in theory be used by a receiver. Since some of the stations transmit positioning signals on more than one frequency, the theoretical number of positioning signals is still higher. Therefore, a receiver comprising the necessary hardware and software could use all these signals to determine its position (with the caveat that some of these signals are reserved to authorized users, for governmental or commercial applications).

But consumer or standard receivers seldom have enough channels to process all the signals that may be available. Moreover, in some areas, some of the signals may not be properly received at the ground surface. Also, some of the satellites may provide limited improvement to the pseudo-range measurements because they are aligned or almost aligned with other satellites (High DOP configuration).

This is why a plurality of relay vehicles 101, 102, 103, 104 according to the invention brings significant advantages: they receive the positioning signals from the positioning infrastructure 110, configure new navigation messages and retransmit them over navigation signals to a rover 130 in Tier 2 part of the architecture using communication downlinks 121, 122, 123, 124. In some embodiments, the navigation message may be sent to the rover on a communication link that is distinct from the carrier of the navigation signals.

The communication downlinks may be RF, optical, acoustic, cable. In some embodiments of the invention, the transmitter of the relay vehicle is configured to transmit GNSS-like signals over an RF link using an ISM band (emitting at, for instance, 433 MHz, 902 MHz, 2.4 GHz or 5.7 GHz, depending on the region). GNSS-like means that the signal modulating the carrier is configured to reproduce a GNSS signal and the navigation message may be decoded by a standard GNSS receiver. A transmitter to produce GNSS-like RF signals is disclosed by European patent application n° 16306512.1 assigned to the same applicant as the instant application.

Other RF downlinks may be used to transmit the navigation message and/or the navigation signal. The position of the rover may be calculated using Time of Arrival (TOA) and/or Time Difference Of Arrival (TDOA) and/or Angle Of Arrival (AOA) methods by triangulating the positions of the transmitter at the receiver using methods known to a person of ordinary skill in the art of positioning.

A Visible Light Communication (VLC) transmitter and downlink may also be used to transmit the navigation message and/or the navigation signals. Such transmitter and corresponding receiver are disclosed by European patent application n° 16305407.5 assigned to the same applicant as the instant application.

An acoustic downlink and transmitter may also be used.

As already explained, the carrier of the navigation message comprising the ephemerides of the relay vehicles (position and time) may be different from the carrier of the navigation signal used to calculate the ranges or pseudo-ranges from the receiver to the relay vehicles. Moreover, the transmission media may also be different: notably, this may be the case for underwater positioning where the navigation signals may be sent on an acoustic link and the navigation message on a cable connecting the rovers to a base station positioned on the sea surface.

Figure 2A:
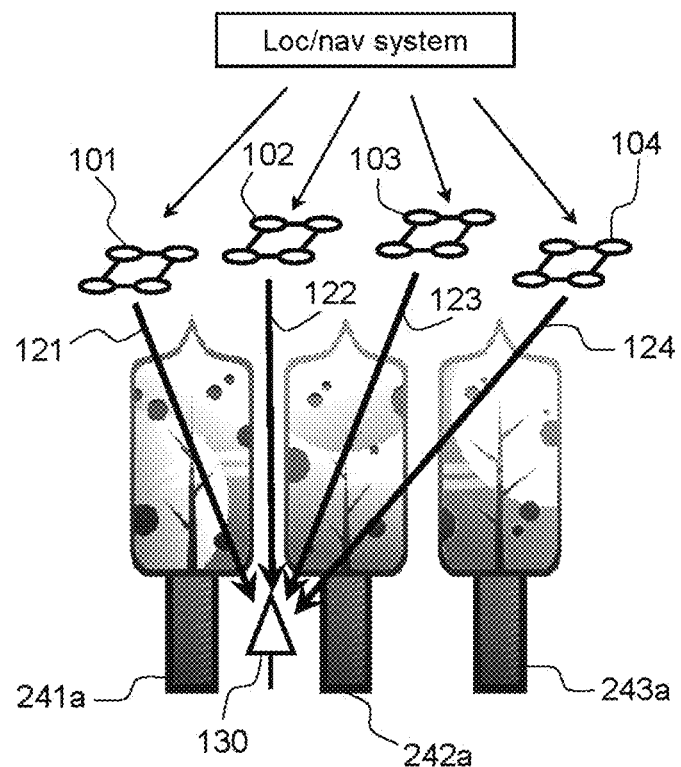
FIGS. 2a and 2b display two variants of the architecture of FIG. 1.
Figure 2B:
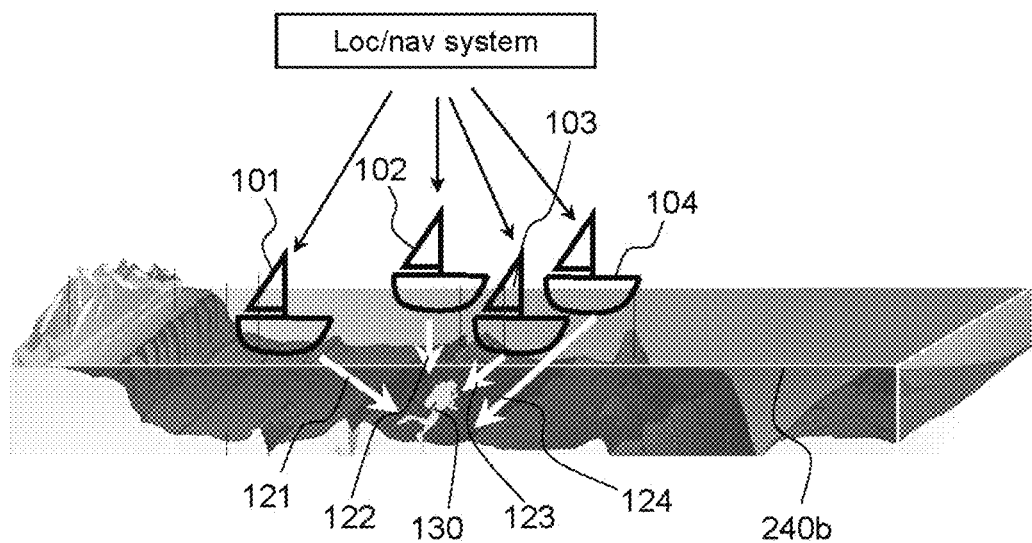

FIGS. 2a and 2b display two variants of the architecture of FIG. 1.

On FIG. 2a is represented a configuration of aerial relay vehicles that may be positioned sufficiently close to the surface of the ground so as to be capable of transmitting navigation signals with a SNR that is high enough so that the navigation messages are received even in covered areas. Some indications on possible distances are given further below in the description in relation to FIG. 7. The aerial vehicles may be drones, helicopters, aircrafts, gliders, kites, balloons or any kind of flying platform. They may be configured as explained below in relation to FIG. 4a.

Relay vehicles 101, 102, 103 and 104 may transmit their navigation signals to rover 130 using communication downlinks 121, 122, 123 an 124 with a high enough SNR despite the presence of trees 241a, 242a and 243a. More relay vehicles could be used without departing from the scope of the invention. Less relay vehicles may also be used, e.g. down to three if the terrain on which the rovers evolve has an altitude that is fairly constant, thus making useless the calculation of their altitude.

On FIG. 2b is represented a configuration of nautical relay vehicles positioned at sea. The receivers embarked on the nautical relay vehicles may be standard GNSS receivers and the transmitters embarked on the nautical relay vehicles may be configured to transmit acoustic or optical navigation signals. The nautical vehicles may be powered buoys or surface boats of different types. They may be configured as explained below in relation to FIG. 4b.

Relay vehicles 101, 102, 103 and 104 may transmit their navigation signals to rover 130 using communication downlinks 121, 122, 123 an 124 with a high enough SNR despite the presence of the water 240b above the rover. More relay vehicles could be used without departing from the scope of the invention.

These two use cases illustrate one of the key advantages of the invention: the GNSS signals have a low SNR, while the navigation signals transmitted by the relay vehicles may be of a much higher SNR. Indeed, in the case of the embodiment of FIG. 2b, the RF navigation signals could not directly reach the rover, unless it is extremely close to the sea level, while the signals from the relay vehicles will be able to do so.

FIGS. 3a, 3b, 3c, 3d, 3e and 3f illustrate a number of variants of vehicles to rovers communication links in a number of embodiments of the invention.

Figure 3A:
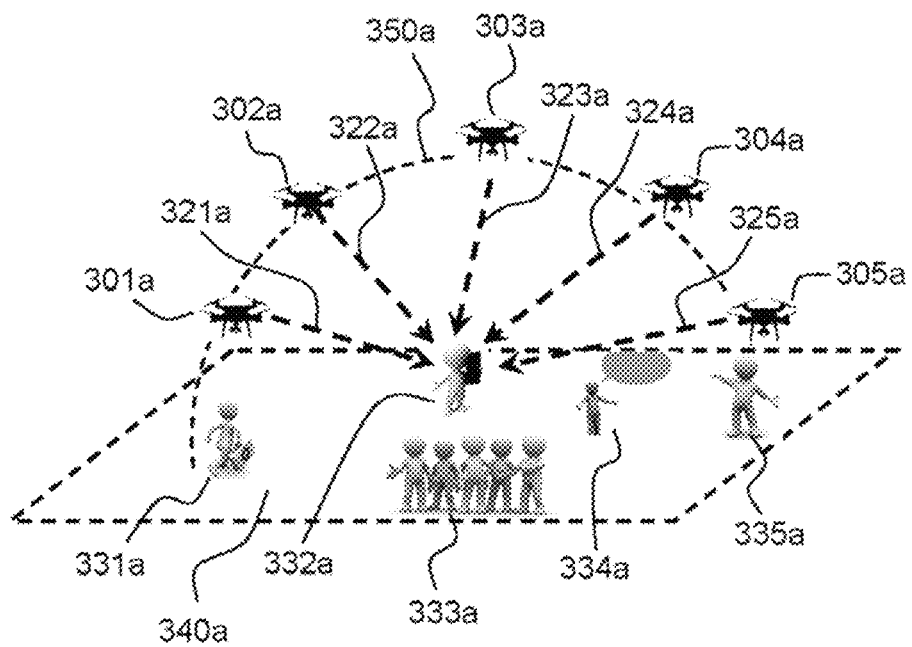
FIGS. 3a, 3b, 3c, 3d, 3e and 3f illustrate a number of variants of vehicles to rovers communication links in a number of embodiments of the invention.

On FIG. 3a is illustrated an embodiment of the invention where a configuration of aerial relay vehicles comprises drones, 301a, 302a, 303a, 304a and 305a. A number of rovers 331a, 332a, 333a, 334a, 335a (in the use case that is illustrated on the figure, the rovers are pedestrians, but they also may be any kind of terrestrial vehicles, such as lorries, automobiles, bicycles, motorcycles, etc. . . . ) are located on a ground surface 340a forming an area of service of the positioning system of the invention. The drones comprise a GNSS receiver (or another kind of navigation signals receiver). They also comprise a transmitter of navigation signals that uses a communication link.

On the figure only the communication links 321a, 322a, 323a, 324a, 325a to rover 332a are illustrated, but the other communication links to the other rovers 331a, 333a, 334a, 335a are also present. The communication links are downlinks only. In this embodiment of the invention, there is no return link whereby the rovers would communicate their positions to the relay vehicles. Therefore, the position of the relay vehicle has to be determined a priori. A manner to achieve this result is to position the relay vehicles on a hemisphere 350a with an equal spacing. Thus the DOP of the navigation signals will be optimal at the center of the area of service of the constellation. If some features characterizing the area of service 340a are known to a supervisor (human or robot) of the positioning system, some variations of the positioning of the relay vehicles may be implemented by the supervisor.

Figure 3B:
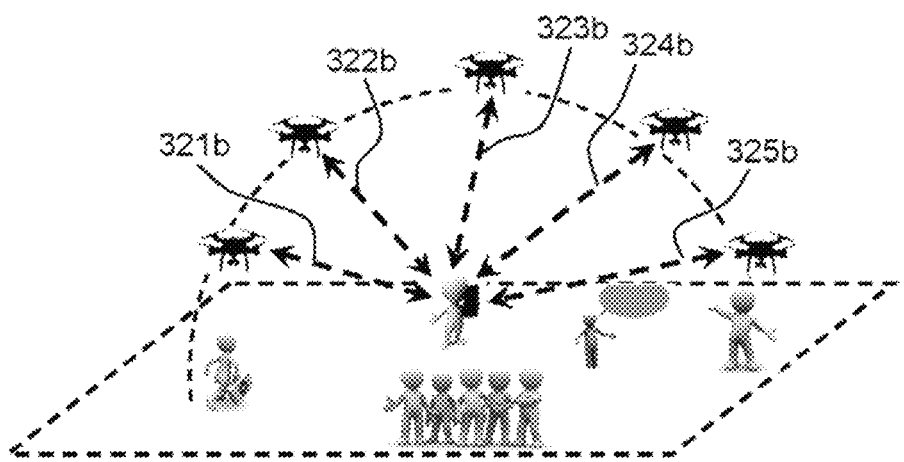

On FIG. 3b is illustrated another embodiment of the invention, where the communication links 321b, 322b, 323b, 324b, 325b are bi-directional, i.e. both downlinks and uplinks. Only the communication links from all the displayed relay vehicles to rover 332a are illustrated on the figure, but the other communication links are also present. The downlinks are of the same kind as the ones illustrated on FIG. 3a, i.e. they are used to transmit the navigation messages and navigation signals. The uplinks are configured to transmit data from the rovers to the receivers of the relay vehicles. This data may comprise one or more of PVT, DOP or SNR information. The number of relay vehicles used to calculate the PVT may also be transmitted. In some embodiments, the pseudo-ranges calculated by each channel of the navigation processors of the rovers may be transmitted to the relay vehicles.

In some embodiments of the invention not illustrated on the figure, the rovers may be organized in a client/server architecture, with one rover being the server of the other rovers and transmitting the information of all rovers to the relay vehicles.

Figure 3C:
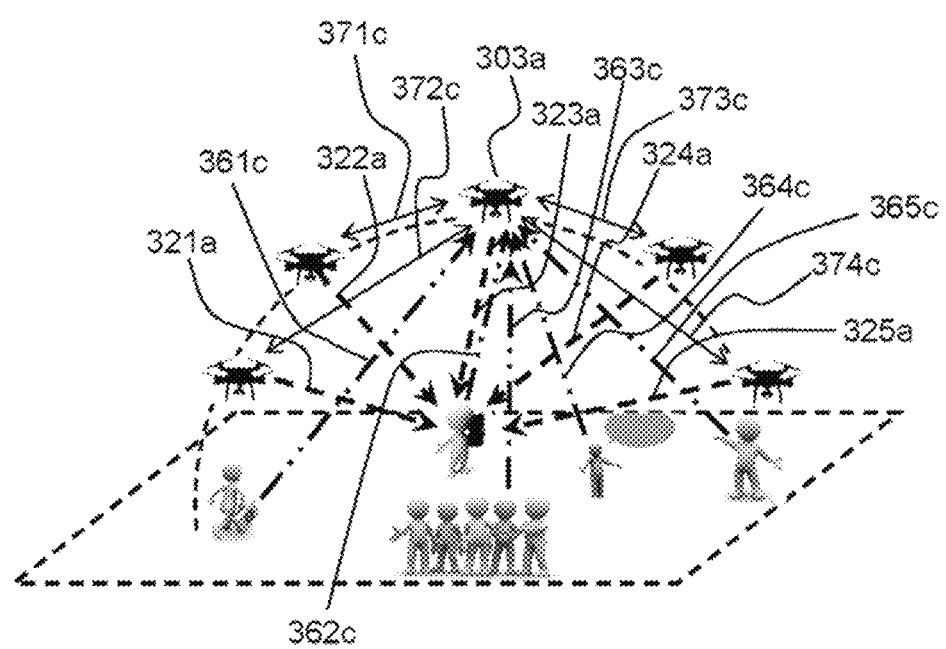

On FIG. 3c is illustrated another embodiment of the invention where one of the communication links is a downlink identical to the communication links of FIG. 3a, 321a, 322a, 323a, 324a, 325a to rover 332a. The uplink communications do not use the same route as on FIG. 3b but a specific route to relay vehicle 303a (361c, 362c, 363c, 364c, 365c). They are all sent to one of the relay vehicles, 303a. This relay vehicle is connected to the other relay vehicles by communication links 371c, 372c, 373c, 374c. The communication links are represented on the figure as bi-directional, but in some embodiments, they may be mono-directional, i.e only relay vehicle 303a has a transmitter configured to transmit to the other relay vehicles, the other receivers only needing a receiver to capture the signals from the master relay vehicle. When all relay vehicles comprise T/R modules, while the communication links have been represented as a hierarchical network, they may also form a mesh network. The information transmitted over the uplinks from the rovers to the master relay vehicle 303a will be of the same kind as the information discussed in relation to FIG. 3b. But in this case, only part of the information may be sent to the other relay vehicles, or even none of this information may be needed by the other relay vehicles if the master vehicle is configured to generate all the navigation commands of the constellation of the relay vehicles from the information received from the rovers (and possibly from a supervising center).

Figure 3D:
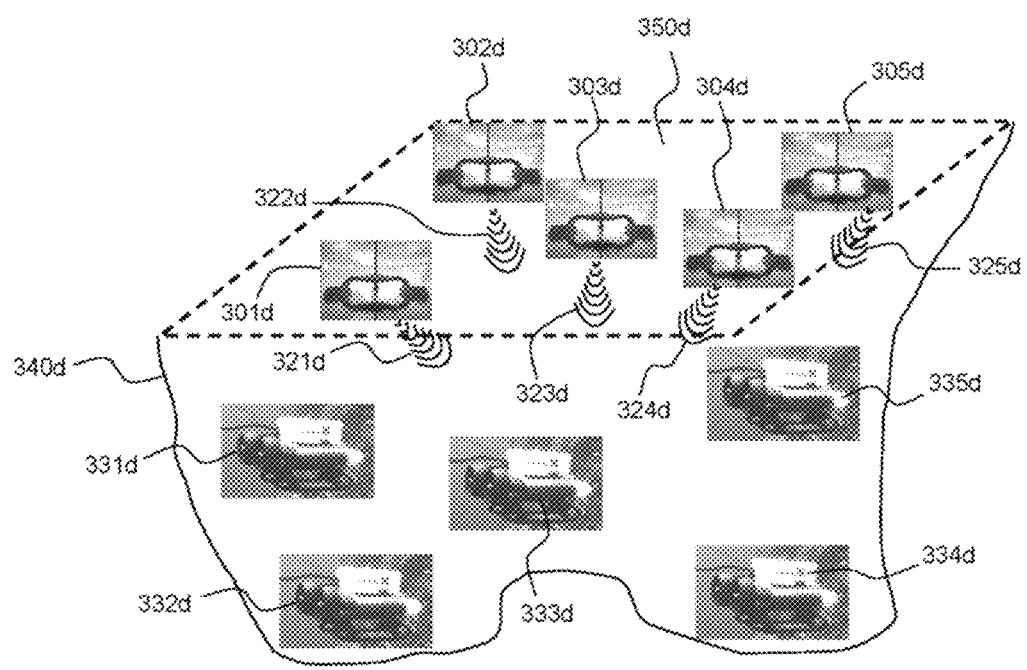

On FIG. 3d is illustrated an embodiment of the invention where a configuration of nautical relay vehicles comprises special purpose surface vehicles, 301d, 302d, 303d, 304d and 305d positioned at sea in an area of service 350d. A number of rovers 331d, 332d, 333d, 334d, 335d (in the use case that is illustrated on the figure, it is underwater special purpose vehicles, but they also may be any kind of underwater vehicles, such as submarines, manned or unmanned) are located above a bottom surface 340d forming an area of service of the positioning system of the invention. The surface vehicles comprise a GNSS receiver (or another kind of navigation signals receiver). They also comprise a transmitter of navigation signals that uses a communication link.

On the figure only the communication links 321d, 322d, 323d, 324d, 325d to rover 333d are illustrated, but the other communication links to the other rovers 331d, 332d, 334d, 335d are also present. The communication links are downlinks only. In the embodiment represented on FIG. 3d, they are acoustic communications. In this embodiment of the invention, there is no return path whereby the rovers communicate their positions to the relay vehicles. Therefore, the position of the relay vehicle has to be determined a priori. A manner to achieve this result is to position the relay vehicles on the area 350d with an equal spacing. Thus the DOP of the navigation signals will be optimal at the center of the area of service of the constellation. If some features characterizing the area of service 340d are known to a supervisor (human or robot) of the positioning system, some variations of the positioning of the relay vehicles may be implemented by the supervisor.

Figure 3E:
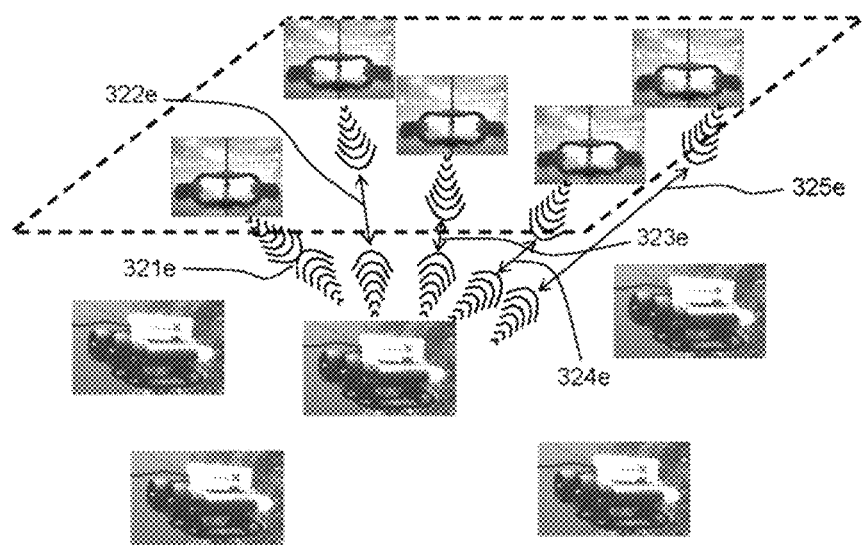

On FIG. 3e is illustrated another embodiment of the invention, where the communication links 321e, 322e, 323e, 324e, 325e are bi-directional, i.e. both downlinks and uplinks. Only the communication links from all the displayed relay vehicles to rover 333d are illustrated on the figure, but the other communication links are also present. The downlinks are of the same kind as the ones illustrated on FIG. 3d, i.e. they are used to transmit the navigation messages and, possibly, the navigation signals. The uplinks are configured to transmit data from the rovers to the receivers of the relay vehicles. This data may comprise one or more of PVT, DOP or SNR information. The number of relay vehicles used to calculate the PVT may also be transmitted. In some embodiments, the pseudo-ranges calculated by each channel of the navigation processors of the rovers, as well as the Doppler measurements, may be transmitted to the relay vehicles.

In some embodiments of the invention not illustrated on the figure, the rovers may be organized in a client/server architecture, with one rover being the server of the other rovers and transmitting the information from all rovers to a base station, a master relay vehicle or all relay vehicles.

Figure 3F:
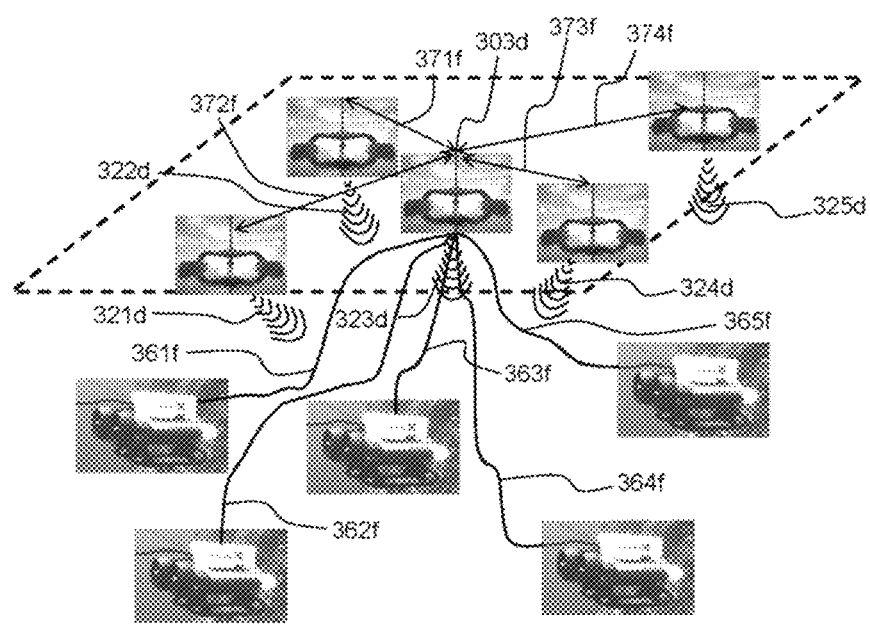

On FIG. 3f is illustrated another embodiment of the invention where one of the communication links is a downlink identical to the communication links of FIG. 3d, 321d, 322d, 323d, 324d, 325d to rover 333d. The uplink communications do not use the same route as on FIG. 3e. They are all sent to one of the relay vehicles, 303d by specific communication links 361f, 362f, 363f, 364f, 365f. In a variant, the uplinks may be to a base station. This base station or master relay vehicle is connected to the other relay vehicles by communication links 371f, 372f, 373f, 374f. The communication links are represented on the figure as bi-directional, but in some embodiments, they may be mono-directional, i.e. only relay vehicle 303d has a transmitter configured to transmit to the other relay vehicles, the other receivers only needing a receiver to capture the signals from the master relay vehicle. When all relay vehicles comprise T/R modules, while the communication links have been represented as a hierarchical network, they may also form a mesh network. The information transmitted over the uplinks from the rovers to the base station or master relay vehicle 303d will be of the same kind as the information discussed in relation to FIG. 3b. But in this case, only part of the information may be sent to the other relay vehicles, or even none of this information may be needed by the other relay vehicles if the master vehicle is configured to generate all the navigation commands of the constellation of relay vehicles from the information received from the rovers (and possibly from a supervising center, collocated or not with a base station).

On all these figures, the relay vehicles are represented by identical symbols. It should be understood that different kind of relay vehicles may operate in the same constellation. For instance, one or more of the relay vehicles may have other missions than relaying positioning signals (a rescue helicopter, a telecommunication relay, a surveillance drone, etc. . . . ). These opportunity relay vehicles may be used at some moments in time as positioning relay vehicles and then leave the relay vehicles constellation.

Figure 4A:
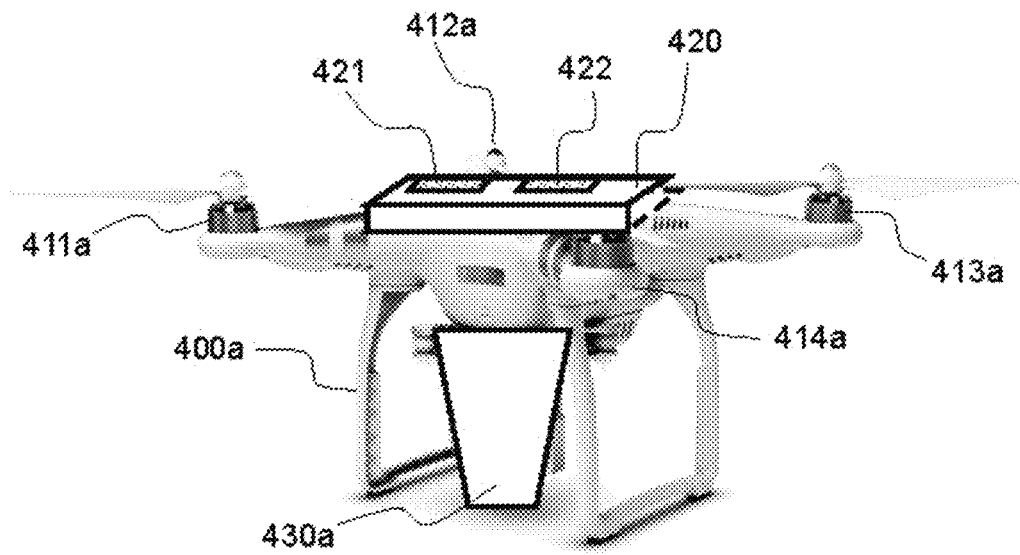
FIGS. 4a and 4b illustrate a number of variants of a simplified architecture of a relay vehicle to implement the invention in a number of its embodiments.
Figure 4B:
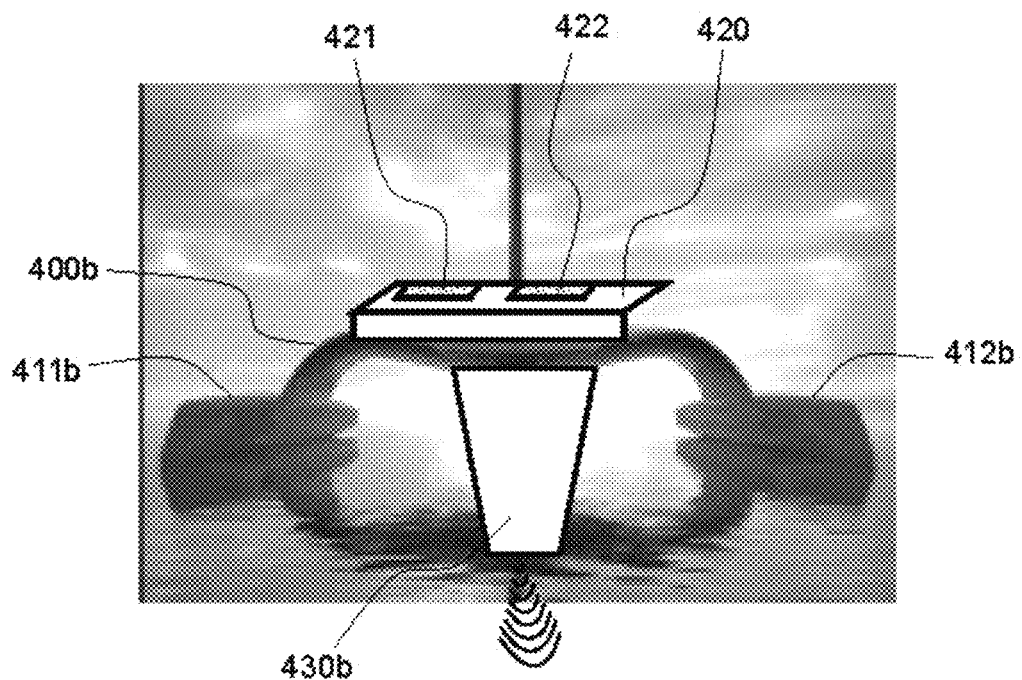

FIGS. 4a and 4b illustrate a number of variants of a simplified architecture of a relay vehicle to implement the invention in a number of its embodiments.

FIG. 4a represents an aerial relay vehicle of a drone type, 400a. By way of non-limitative illustration, it comprises four engines 411a, 412a, 413a, 414a. It also comprises a positioning signals receiver, 420, for instance a GNSS receiver. The GNSS receiver may be a standard receiver. It may comprise an upward looking antenna assembly 421, 422. The antenna assembly may be a combination of patch antennas comprising, for instance two elements, as represented on the figure, while the invention is in no way limited to such a configuration. In some embodiments, the antenna assembly may be selected to be able to shape the radiating pattern so as to improve the relative SNR of the satellites in LOS. Antenna assemblies of this type are disclosed by European patent applications n° 16305611.2 and 16306791.1 assigned to the same applicant as the instant application. The antenna assembly may also be a Controlled Radiated Pattern Antenna (CRPA) to provide an anti-jamming and/or anti-spoofing capability, especially for mission critical systems. Preferably the receiver 420 will have a multi-constellation capability to increase the number of positioning signals to select from.

The aerial relay vehicle 400a also comprises a transmitter of positioning signals 430a. In some embodiments, the transmitter may be an RF transmitter, for instance of GNSS-like signals in one of the Wi-Fi or other ISM bands. The transmitter will have a downward looking antenna arrangement (not shown on the figure). The downward looking antenna arrangement may comprise one or more antenna elements. A single antenna element may be omnidirectional or directional, or at least with a preferred FOV in which most of the radiating power is concentrated to limit multipath reflections to a minimum. The antenna arrangement may also comprise a plurality of antenna elements that may be configured to form an adaptive radiating pattern. In such a configuration, the antenna arrangement may also comprise one or more driving circuits. The antenna arrangement may be configured to form a radiating pattern that has a wide FOV in a first plane that is for instance collinear to a main longitudinal direction of a urban canyon and that has a narrow FOV in a second plane that is perpendicular to the first plane. The antenna arrangement may also comprise an array of antenna elements that are driven by a digital beam former. The configuration of the radiating pattern may be made to depend on the position of the relay vehicle, on the configuration of the terrain and on the position of the rovers. The command controls to vary the radiating pattern of the antenna arrangements based on these parameters may be prepared in an Antenna Control Unit or ACU (not shown on the figure). Configurations of antenna arrangements to form radiating patterns of this type are disclosed by European patent application filed under n° 16306791.1 that is assigned to the same applicant as the instant application.

Since the transmitter will be configured to transmit at the highest possible power, it will have to be isolated from the GNSS receiver antenna(s) to avoid perturbing its conditions of reception. For instance, the receiver may comprise an isolating housing, or at least a backplane.

Optionally, the aerial relay vehicle 400a may comprise a receiver of uplink signals from the rovers, for instance of WiFi signals (not shown on the figure). This receiver may be combined in the same module 430a as the transmitter. Alternatively, or in addition, the aerial relay vehicle 400a may also comprise a receiver of signals from other relay vehicles (not shown on the figure) that may use the same band as the uplink from the rovers, or another band. This receiver of signals from other relay vehicles may be combined with the uplink receiver or may be distinct. In some embodiments, the aerial relay vehicle 400a may also comprise a transmitter to transmit information to other relay vehicles (not shown on the figure). The transmitter may be collocated or not with the receiver of signals from other relay vehicles and/or the transmitter of positioning signals.

The aerial relay vehicle 400a may comprise a processor (not shown on the figure) that is used to calculate navigation commands to optimize the geometrical configuration of the constellation of relay vehicles, as discussed below in relation to FIG. 6. The processor receives as input data from the rovers (number of relays used to calculate a PVT, their PVT, the PVT of the rover, one of the DOP measurements of the rover (see details below in relation to FIGS. 8a and/or 8b), the SNR of the rover and/or raw data used to calculated the navigation solution) and possibly from the other relay vehicles and calculates the geometry that will avoid a degradation of/improve DOP and/or SNR. The calculation may be performed by all relay vehicles, by some relay vehicles only or by a server at a base station. If each relay vehicle calculates its own navigation commands, it needs to know the position of each of the other relay vehicles. It may receive these positions either by a communication link with these other relay vehicles (or one of them) or from the rovers: since the rovers receive the ephemerides of the whole constellation of relay vehicles and use them in the calculation of their navigation solution, they certainly know the positions of all the relay vehicles in view.

FIG. 4b represents a nautical relay vehicle of a special purpose type, 400b.

By way of non-limitative example, the nautical relay vehicle 400b may have two propulsion modules 411b, 412b. It will comprise a positioning signals receiver 420 that will be identical to the receiver of the aerial relay vehicle 400a, except for the package that may have to be waterproof and resistant to corrosion by sea water. This receiver will thus not be described further.

The nautical relay vehicle 400b also comprises a transmitter of positioning signals 430b. In some embodiments, the transmitter may comprise one or more acoustic transmitters, for instance of GNSS-like signals. The transmitter will have downward looking acoustic transducer immersed in the sea water (not shown on the figure). The variants explained above in relation to FIG. 400a may also apply to the nautical vehicle of FIG. 400b, except that the RF communications links will be replaced by acoustic or optical communication links.

In addition, another variant may apply to the communication links of the nautical relay vehicles. Often, underwater vehicles are connected to a boat or a platform on the sea surface (not shown on the figure) by a cable that carries a power line and a data line. This data line may be used to transmit the ephemerides of the relay vehicles of the constellation, so as to minimize the throughput that is needed on the acoustic downlink. The data line may also be used as the uplink of information from the rovers that is needed to calculate the optimal positioning of the relay vehicles.

Figure 5A:
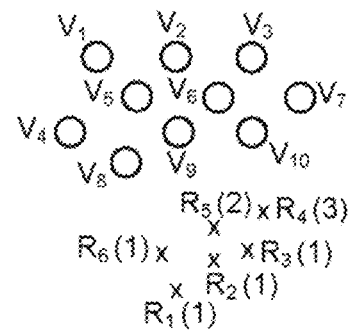
FIGS. 5a, 5b and 5c illustrate three configurations of relative positioning of relay vehicles and rovers in a number of embodiments of the invention.
Figure 5B:
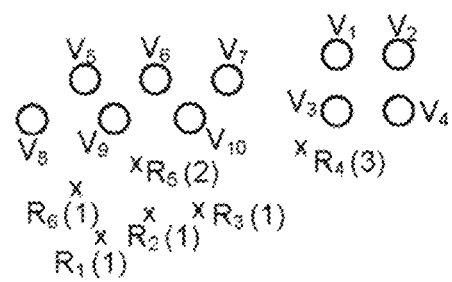
Figure 5C:
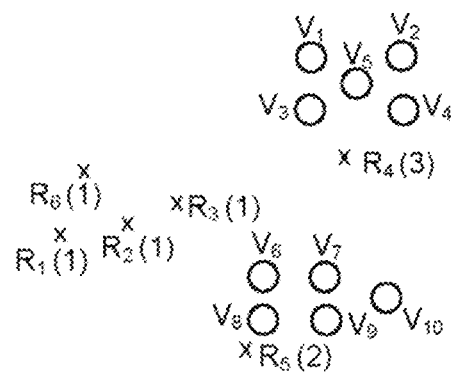

FIGS. 5a, 5b and 5c illustrate three configurations of relative positioning of relay vehicles and rovers in a number of embodiments of the invention.

There are six rovers $R_1$ to $R_6$ located at different positions on each of the figures. The number between parentheses is a priority index that is attributed to the rovers by a supervisor of the system. In this embodiment, three priority indexes have been created, from 1 the lowest priority to 3, the highest priority.

On FIG. 5a, the rovers $R_1$ to $R_6$ are all grouped within a distance where the DOP of the positioning signals received by all rovers may be considered very close (see below comments on an evaluation of this distance in the part of the description in relation to FIGS. 8a and 8b). There is therefore no need to take into account the priority index. All rovers may be considered equal and remain grouped, so that the configuration of the constellation of relay vehicles may remain fixed.

On FIG. 5b, rover $R_4$, with a priority index equal to 3, has moved out of the original group. It is possible to allocate four relay vehicles $V_1$ to $V_4$ to the coverage of rover $R_4$, while maintaining the 6 remaining relay vehicles $V_5$ to $V_{10}$ to service the other rovers with a lower priority index that remain grouped.

On FIG. 5c, rover $R_5$, with a priority index equal to 2, has also moved out of the original group, but at a distance from rover $R_4$. It is therefore impossible to allocate a minimum of four relay vehicles at the same time to priority rovers $R_4$ and $R_5$ and to the rovers with a minimum priority index. As shown on FIG. 5c, a rationale solution is to allocate six relay vehicles to priority rover $R_4$ and four relay vehicles to the rover of intermediate priority $R_5$. No relay vehicle is allocated to the other rovers with the lowest priority index. In some embodiments, the allocation of relay vehicles to rovers having different priority indexes may also take into account the conditions of reception (DOP, SNR, etc. . . . ) at said rover combined with the priority indexes. For instance, if the conditions of reception are excellent for rover $R_4$ and not so good for rover, 6 relay vehicles may be allocated to and 4 to R4 despite the fact that the R4 has a higher priority index than R5. With such an allocation, the conditions of reception are optimized at system level. As in the previous embodiment, no relay vehicle is allocated to the rovers with the lowest priority index.

In some embodiments, the priority indexes may vary dynamically based on the evolution of the missions of the rovers. This is clear in the use cases of military, security or rescue operations. It may also happen in the case of autonomous vehicles, whose priority indexes may vary based on speed or on the type of lanes where they travel.

Figure 6:
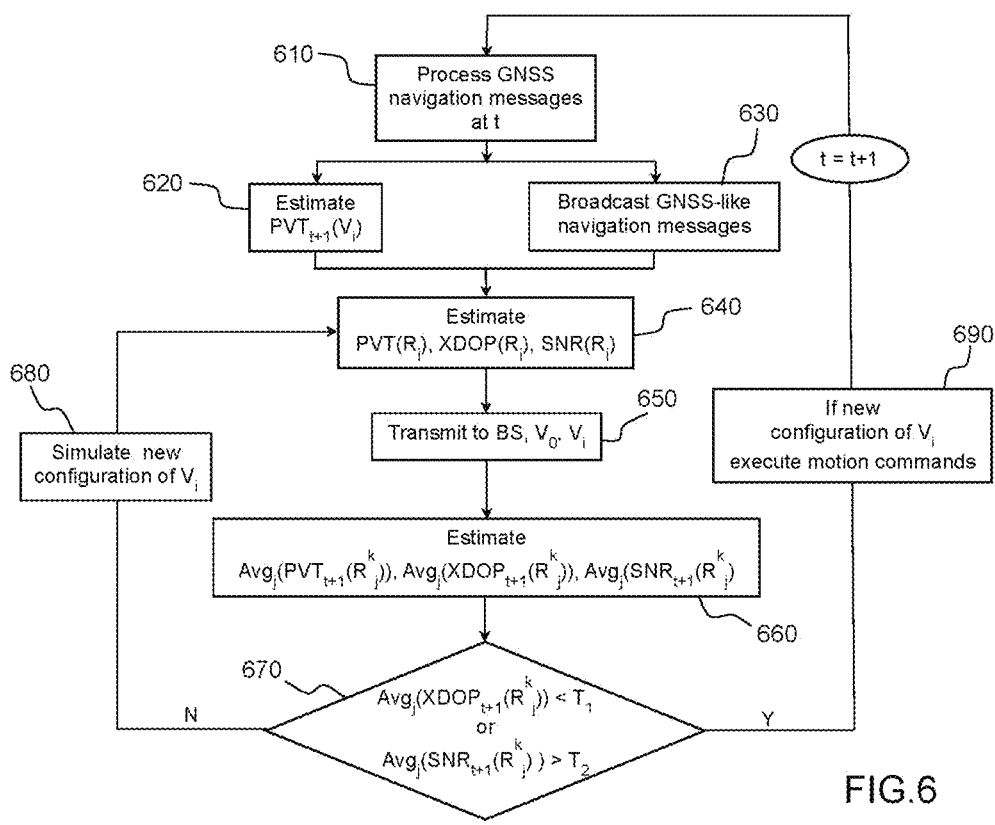
FIG. 6 displays a flow chart of a method to define navigation commands of a relay vehicle in a number of embodiments of the invention.

FIG. 6 displays a flow chart of a method to define navigation commands of a relay vehicle in a number of embodiments of the invention.

When a constellation of relay vehicles is operating, each one of the relay vehicles $V_i$ processes the positioning signals at each epoch at a step 610. The receiver of the relay vehicle predicts its estimated PVT at time t+1 at a step 620. This estimation is based on a projection of the next position $P_{t+1}$ based on position $P_t$ and velocity at time t, $V_t$. In parallel, the PVT (PVT$_t(V_i)$) of relay vehicle $V_i$ is broadcast to the rovers on the surface by the downlink at a step 630. PVT$_t(V_i)$ is transmitted by the transmitter 430a, 430b. It is to be noted that the rate of refreshing and transmitting PVT$_t(V_i)$ may be lower than the refreshing rate of the positioning signals. For instance, the frequency of transmission of the PVT$_t(V_i)$ may be every 10 s when the dynamicity of the relay vehicle and/or the rover are not too high. When there dynamicity of at least one of the relay vehicle or the rover is significant, a refresh frequency of, for example, 1 s may be necessary.

At a step 640, the PVT of each rover $R_j$ (PVT($R_j$)) is determined in the interval [t, t+1] based on the positioning signals of a number of relay vehicles (at least 4, or 3 if the altitude does not need to be determined by the calculation) and on the ephemerides that are transmitted either by modulating the carrier of the positioning signals or by separate channels. When the positioning signals are GNSS-like signals, the calculation of the PVT is based on standard pseudorange measurements for each relay vehicle. A selection of the relay vehicles that are included in the calculation of PVT ($R_j$) may be performed based on the SNR of the positioning signals and/or indexes of quality of said signals to eliminate some relay vehicles that are received at each rover. A minimum number of relay vehicles and/or a DOP index may also be used in the selection. The selection may be performed based on predetermined thresholds of SNR, quality indexes, number of relay vehicles or DOP.

Together with the estimation of PVT ($R_j$), other positioning data at time t+1 may be estimated for each of the rovers. This data may include one or more values representative of DOP (xDOP($R_j$)) and SNR (SNR($R_j$)). Different xDOP values may be used, as explained further down in the description in relation to FIGS. 8a and 8b. The number of relay vehicles from which PVT($R_j$) is calculated may also be included.

In the embodiments of the invention that comprise an uplink from all or some of the rovers to one or more relay vehicles, the rovers $R_j$ transmit data, at a step 650, to a base station BS or to a selected relay vehicle $V_0$, or to all the relay vehicles $V_i$. The base station BS may be ground or sea based or hosted by a specific vehicle that is or is not part of the group of relay vehicles.

Then, at a step 660, values representative of the data sent by each rover $R_j$ through the uplink are calculated. The calculation may be performed at the BS, at the master relay vehicle $V_0$ or at each relay vehicle $V_i$. The values may be averages (as illustrated on the figure). They also may be midpoints. Averages or midpoints may take into account the data received from all the rovers, or a selection may be performed to eliminate outliers whose values are outside predetermined ranges. The ranges may be adapted dynamically or remain constant. The data that are processed basically include PVT data, SNR data and xDOP data. The averages or midpoints may be weighted to take into account priority indexes k that are allocated to the rovers based on the missions of the rovers. These priority indexes have been explained above in relation to FIGS. 5a, 5b and 5c.

Then, at a step 670, the selected values representative of data sent by each rover are compared to thresholds. In the embodiments represented on the figures, the selected values are representative of DOP and SNR and are compared respectively to threshold $T_1$ and threshold $T_2$.

The test determines if the value representative of DOP is lower than $T_1$ or if the value representative of SNR is higher than $T_2$. If not, a new configuration of the relay vehicles is simulated at a step 680. If so, the configuration of the relay vehicles is either preserved or changed by navigation commands, if the last simulated configuration is different from the previous configuration, at a step 690.

For performing the simulation of step 680, a number of methods known in the art may be used. A method may use a brute force calculation that estimates the new values of DOP and SNR after a move of each of the relay vehicles by performing stepwise movements within preset limits. The algorithm is stopped when the new values representative of DOP and SNR match the thresholds $T_1$ and $T_2$.

Brute force calculations may be possible when performed at a BS with a server having sufficient processing capacity. This is notably because DOP calculations require inversion of matrices that are quite demanding in terms of processing capacities. For performing calculations at a relay vehicle with limited processing capacity, it may be necessary to filter the space of possible solutions before running the algorithm. Some filtering options are explained below, but it will be easily understood that a person of ordinary skill may think of alternative options for filtering the space of likely solutions.

By way of example only, for increasing the SNR of reception of the positioning signals, the determination of the direction of motion of each relay vehicle may be based on a ray casting algorithm in a 3D map of the area of service to eliminate the positions of the relay vehicles where the downlink signals would hit obstacles.

For decreasing the DOP of the positioning signals, the determination of motion of each relay vehicle may be based on a geometric simulation of the configuration of relay vehicles to eliminate the positions of the relay vehicles that would produce configurations where a number of relay vehicles would be aligned or almost aligned. An algorithm of this type is disclosed in "A Recursive Quasi-optimal Fast Satellite Selection Method for GNSS Receivers" (Min Liu, Beijing Institute of Technology, et al. ION GNSS 2009, September 2009, Savannah, Ga., USA). Some artificial intelligence procedures to filter the space of possible solutions may also be used. An Ant Colony Optimization is disclosed in "An Effective Method for GPS GDOP Clustering Using Ant Colony Optimization Optimization" (M. R. Mosavi, Iran University of Science and Technology, Asian Journal of Geoinformatics, VoL. 10, N° 4, 2010).

After performance of step 680, a new estimation of the values representatives of DOP and SNR is performed (step 640). After performance of step 690, the time counter is increased (t=t+1).

FIG. 7 is a table of signal losses in a number of embodiments of a communication link to implement the invention.

To implement the invention, it is useful to determine the transmitting power to be used at the relay vehicles.

The table of FIG. 7 lists the losses for two carrier frequencies (433 MHz and 2.4 GHz), four distances between the transmitter Tx and the receiver Rx (0, 1, 1, 10 and 100 km), two values of Tx antenna gain (0 and 3 dB) and two values of Rx antenna gain (0 and 3 dB). The values of the losses demonstrate that a power of 100 mW of the transmitter may be adequate because it will offer a margin of 20 to 50 dB compared to open sky GNSS signals, which will be useful to cover possible losses due the configuration of the terrain in the area of service. Moreover, in most configurations, the distance between the transmitter and the receiver will be lower than 1 km.

Figure 8A:
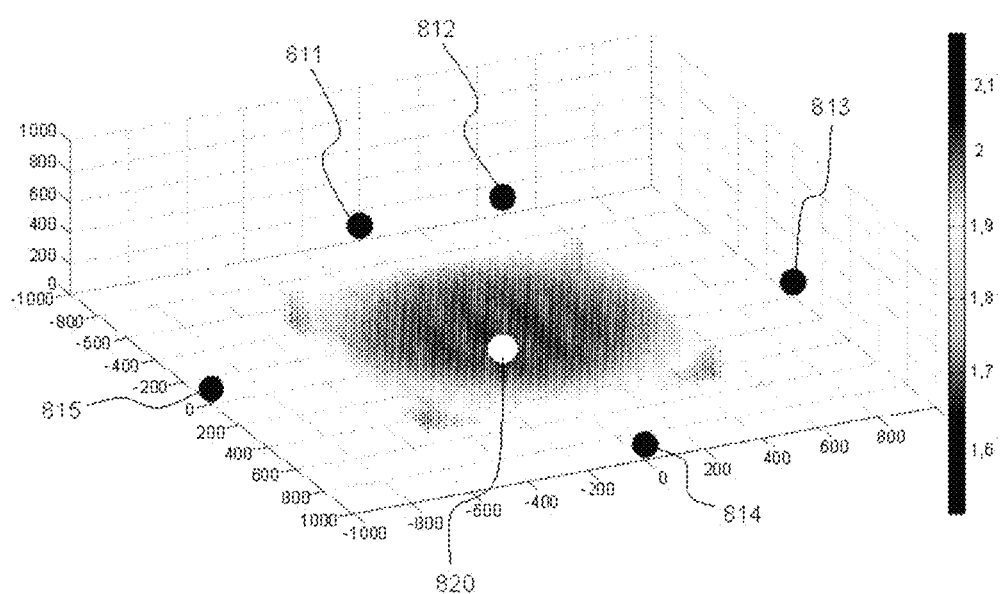
FIGS. 8a and 8b are viewgraphs representing Geometric Dilution Of Precision and its variation in an area of responsibility of a number of relay vehicles according to the invention.
Figure 8B:
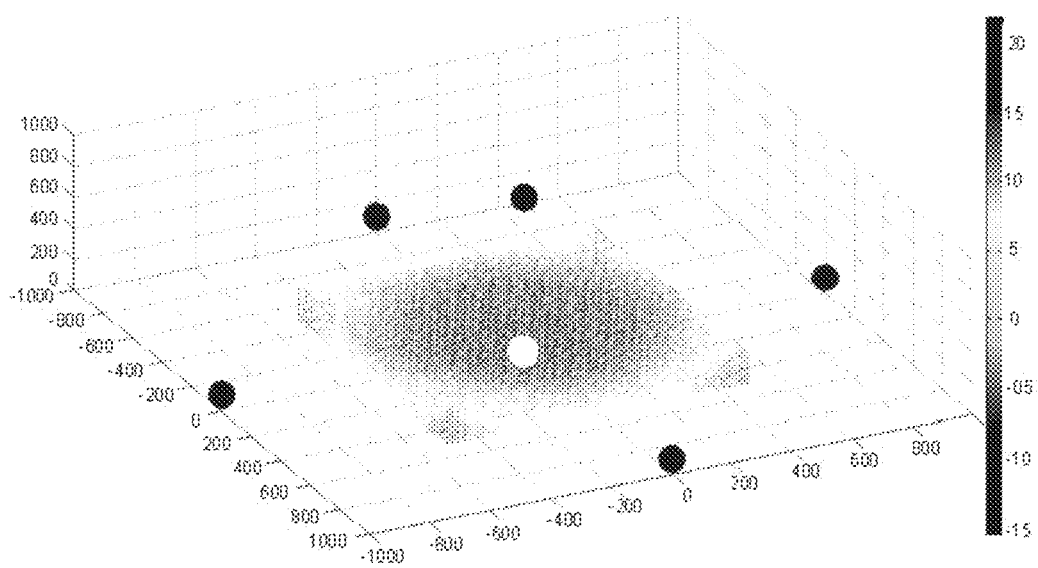

FIGS. 8a and 8b are viewgraphs representing Geometric Dilution Of Precision and its variation in an area of responsibility of a number of relay vehicles according to the invention.

Geometric Dilution of Precision or GDOP is a factor that can be multiplied by the standard deviation of each pseudo-range measurement (User Equivalent Range Error or UERE) to determine the final standard deviation of the 3D position and time solution of the receiver. Other DOPs are defined as well:

Horizontal Dilution of Precision or HDOP that is the 2D DOP;
Vertical Dilution of Precision or VDOP;
Position Dilution of Precision or PDOP that is the 3D DOP that combines HDOP and VDOP;
Time Dilution of Precision or TDOP.

In some applications, it may be sufficient to calculate the HDOP.

The figures illustrate the values of GDOP at a number of locations in an area of service for a specific configuration of the relay vehicles. The rover 820 perceives different GDOP depending on its relative position with regard to relay vehicles 811, 812, 813, 814 and 815, as illustrated on FIG. 8a. The values are indicated by the shades on the scale on the right of FIG. 8a.

FIG. 8b represents the relative variations of GDOP between the various positions of the area of service with regard to the GDOP perceived by rover 820 when it is located at the green position (center of the service area). It demonstrates that the relative variation is lower than 10% within an area of approximately 100 m around the green position in that case. By taking a margin to take account of local variations, it is almost certain that, in that case, when the area of service has a radius of about 50 m, by taking the value of GDOP at the bari-center of the rovers, the optimization of GDOP for this position will be optimal or quasi-optimal for all rovers in this area.

The examples disclosed in this specification are only illustrative of some embodiments of the invention. They do not in any manner limit the scope of said invention which is defined by the appended claims.

The invention claimed is:

1. A vehicle, to be used with other vehicles in order to form a constellation of vehicles transmitting positioning signals, configured to navigate at or above a surface level, the vehicle comprising:
    a receiver of navigation signals;
    one or more transmit units;
    a processor;
    wherein
        the one or more transmit units are configured to transmit to rovers located under or at the surface level a positioning signal representative of one or more of a position, a velocity or a time of the vehicle, said positioning signal determined based on navigation signals received by the receiver of navigation signals; and
        the processor is configured to one or more of acquire or calculate navigation commands to navigate the vehicle based on a criterion comprising an optimization of a position of the vehicles of the constellation of vehicle to at least one of the rovers, said optimization being based on a privileged treatment of one or more among the rovers in an area of responsibility allocated to the vehicle by attributing priority indexes to the priority indexes to optimize the position of the constellation of vehicles.

2. The vehicle of claim 1, being a sea level vehicle, the rovers being underwater rovers and the one or more communication links being one or more of acoustic and optical.

3. The vehicle of claim 1, being an air vehicle and the rovers being ground level rovers.

4. The vehicle of claim 3, wherein the one or more transmit units use one or more of an RF or an optical downlink to the rovers.

5. The vehicle of claim 3, further comprising one or more receive units using one of an RF or an optical uplink from one or more of another air vehicle, a rover or a base station.

6. The vehicle of claim 3, wherein the processor acquires the navigation commands from one or more of another air vehicle, a rover or a base station.

7. The vehicle of claim 3, wherein the processor acquires a position of the at least one rover from one or more of another air vehicle, a rover or a base station and calculates the navigation commands therefrom.

8. The vehicle of claim 1, wherein the navigation commands take into account one or more indexes representative of a number of vehicles that transmit positioning signals to the at least a rover, an elevation of each vehicle in the number of vehicles relative to the surface level or a quality of the transmission.

9. The vehicle of claim 8, wherein one of the indexes taken into account by the navigation commands is a SNR received at one of the rovers.

10. The vehicle of claim 1, wherein the optimization of the relative positioning to the plurality of other vehicles and/or to the plurality of the rovers is based on an a priori knowledge of a topography of the surface level.

11. The vehicle of claim 1, wherein an area of responsibility is allocated to a group of three or more vehicles and the privileged treatment is defined by an index of priority allocated to a plurality of clusters, each cluster comprising one or more rovers, a first sub-group of the group of vehicles being allocated to the service of a first cluster of one or more rovers with a higher priority, a second sub-group of the group of vehicles being allocated to a second cluster of rovers if it comprises three or more vehicles and being allocated to the first sub-group if not.

12. The vehicle of claim 11, wherein the optimization of the relative positioning to the plurality of the rovers is based on a combination of the index of priority with an index of quality of reception at the rovers, the index of quality being representative of one or more of an xDOP or an SNR.

13. The vehicle of claim 12, wherein the navigation commands are determined after one or more simulations of a projection of the index of quality based on projected movements of one or more of the rovers or the vehicles.

14. A positioning method comprising:
navigating a vehicle, among a set of vehicles forming a constellation of vehicles transmitting positioning signals, at or above a surface level;
receiving navigation signals at a receiver on-board the vehicle;
establishing one or more communication links with one or more other vehicles of the constellation of vehicles or rovers located under or at the surface level;
transmitting to the rovers a positioning signal representative of one or more of a position, a velocity or a time of the vehicle, said positioning signal determined based on navigation signals received by the receiver of navigation signals;
acquiring or calculating at a processor navigation commands to navigate the vehicle based on a criterion comprising an optimization of a position g of the vehicles of the constellation of vehicles to at least one of the rovers, said optimization being based on a privileged treatment of one or more among the rovers in an area of responsibility allocated to the vehicle by attributing priority indexes to the rovers or to clusters comprising one or more rovers and taking into account the priority indexes to optimize the position of the constellation of vehicles.

* * * * *

UNITED STATES PATENT AND TRADEMARK OFFICE
CERTIFICATE OF CORRECTION

PATENT NO. : 10,605,927 B2
APPLICATION NO. : 15/936704
DATED : March 31, 2020
INVENTOR(S) : François-Xavier Marmet and Nicolas Capet Page 1 of 1

It is certified that error appears in the above-identified patent and that said Letters Patent is hereby corrected as shown below:

In the Claims

In Claim 1, Column 14, Line 65 delete "constellation of vehicle" and insert --constellation of vehicles--.

In Claim 1, Column 15, Line 2 after "priority indexes to the" insert --rovers or to clusters comprising one or more rovers and taking into account the--.

Signed and Sealed this
Second Day of June, 2020

Andrei Iancu
*Director of the United States Patent and Trademark Office*